US007577002B2

(12) United States Patent
Yang

(10) Patent No.: US 7,577,002 B2
(45) Date of Patent: *Aug. 18, 2009

(54) FREQUENCY HOPPING CONTROL CIRCUIT FOR REDUCING EMI OF POWER SUPPLIES

(75) Inventor: Ta-yung Yang, Milpitas, CA (US)

(73) Assignee: System General Corp., Taipei Hsien (TW)

(*) Notice: Subject to any disclaimer, the term of this patent is extended or adjusted under 35 U.S.C. 154(b) by 342 days.

This patent is subject to a terminal disclaimer.

(21) Appl. No.: 11/298,023

(22) Filed: Dec. 8, 2005

(65) Prior Publication Data

US 2007/0132440 A1 Jun. 14, 2007

(51) Int. Cl.
*H02M 5/27* (2006.01)

(52) U.S. Cl. .......................... 363/1; 323/283; 323/284

(58) Field of Classification Search ................ 323/281, 323/283, 284; 363/16, 21.01, 21.11, 21.18, 363/40, 41
See application file for complete search history.

(56) References Cited

U.S. PATENT DOCUMENTS

| | | | | |
|---|---|---|---|---|
| 3,971,972 | A * | 7/1976 | Stich | 318/811 |
| 4,190,882 | A * | 2/1980 | Chevalier et al. | 363/26 |
| 4,288,675 | A * | 9/1981 | Inoue | 219/69.17 |
| 5,661,643 | A * | 8/1997 | Blakely et al. | 363/21.16 |
| 5,686,867 | A * | 11/1997 | Sutardja et al. | 331/57 |
| 5,758,271 | A * | 5/1998 | Rich et al. | 455/234.1 |
| 5,889,922 | A * | 3/1999 | Bufe et al. | 388/804 |
| 5,892,352 | A * | 4/1999 | Kolar et al. | 323/213 |
| 6,127,816 | A * | 10/2000 | Hirst | 323/283 |
| 6,229,366 | B1 | 5/2001 | Balakirshnan et al. | 327/172 |
| 6,249,876 | B1 | 6/2001 | Balakrishnan et al. | 713/501 |
| 6,380,813 | B1 * | 4/2002 | Noumi et al. | 331/49 |
| 7,082,293 | B1 * | 7/2006 | Rofougaran et al. | 455/260 |
| 2003/0072170 | A1 * | 4/2003 | Yang et al. | 363/41 |
| 2003/0112642 | A1 * | 6/2003 | Wang | 363/21.12 |
| 2005/0071114 | A1 * | 3/2005 | Nehrig | 702/127 |

OTHER PUBLICATIONS

M. Rahkala et al., "Effects of Switching Frequency Modulation on EMI performance of a Converter Using Spread Spectrum Approach" IEEE Transactions on Power Electronics, vol. 19, No. 2, Jan. 2002, pp. 93-99.

Feng Lin et al., "Reduction of Power Supply EMI Emission by Switching Frequency Modulation", IEEE Transactions on Power Electronics, vol. 9, No. 1, Jan. 1994, pp. 132-137.

* cited by examiner

*Primary Examiner*—Akm E Ullah
*Assistant Examiner*—Arun Williams
(74) *Attorney, Agent, or Firm*—J.C. Patents

(57) ABSTRACT

A control circuit having frequency hopping capability is used for reducing the EMI of a power supply. A switching circuit is coupled to a feedback circuit to generate a switching signal for regulating an output of the power supply. A first oscillator determines the switching frequency of the switching signal. A second oscillator is coupled to the first oscillator to modulate the switching frequency of the switching signal for reducing the EMI of the power supply. An output of the second oscillator controls the attenuation rate of the feedback signal of the feedback circuit. Therefore, even if the switching frequency is hopped, the output power and the output voltage can still be kept constant.

6 Claims, 5 Drawing Sheets

FREQUENCY HOPPING CONTROL CIRCUIT FOR REDUCING EMI OF POWER SUPPLIES

BACKGROUND OF THE INVENTION

1. Field of the Invention

The present invention relates to a power supply. More particularly, the present invention relates to the control circuit of a switching power supply.

2. Description of Related Art

Power supplies are used for converting an unregulated power into a regulated voltage or current. FIG. 1 illustrates a conventional power supply. A control circuit 10 generates a switching signal $V_{SW}$ for controlling a transistor 20 to switch a transformer 30. A resistor 40 senses a switching current $I_P$ of the transformer 30 to control the switching. A resistor 45 determines the switching frequency of the control circuit 10. A terminal FB of the control circuit 10 is connected to an output of a feedback circuit 50. The feedback circuit 50 is coupled to an output terminal of the power supply to generate a feedback signal $V_{FB}$. The duty cycle of the switching signal $V_{SW}$ is modulated in response to the feedback signal $V_{FB}$ to determine the power transferred from an input terminal of the power supply to the output terminal of the power supply.

Even though the switching technology reduces the size of power supplies, the electric and magnetic interference (EMI) generated by a switching device has an impact on the power supply and the peripheral equipments thereof. Therefore, apparatuses for reducing or preventing EMI (e.g. EMI filter, transformer protector, etc) are disposed in power supplies. However, such kinds of apparatus increase power consumption, the cost and the size of power supplies. Recently, frequency modulation or frequency hopping technologies are applied in many conventional technologies to reduce EMI. For example, the conventional technologies "Reduction of Power Supply EMI Emission by Switching Frequency Modulation" (IEEE Transactions on Power Electronics, VOL. 9. No. 1. January 1994) and "Effects of Switching Frequency Modulation on EMI Performance of a Converter Using Spread Spectrum Approach" (Applied Power Electronics Conference and Exposition, 2002, 17-Annual, IEEE, Volume 1, 10-14, March, 2002, Pages: 93-99) etc, and U.S. Pat. No. 6,229,366 "Offline Converter with Integrated Softstart and Frequency Jitter" (May 8, 2001) and U.S. Pat. No. 6,249,876 "Frequency Jittering Control for Varying the Switching Frequency of a Power Supply" (Jun. 19, 2001) etc., have been disclosed.

However, a disadvantage of the conventional technologies is that the output of the power supply will carry an unexpected ripple signal when there is frequency hopping. How the unexpected ripple signal is generated in the presence of frequency hopping will be described below with reference to the formulas.

An output power $P_O$ of the power supply is the product of an output voltage $V_O$ and an output current $I_O$ of the power supply, the equation of which is expressed as:

$$P_O = V_O \times I_O = \eta \times P_{IN} \tag{1}$$

The relation between the input power $P_{IN}$ of the transformer 30 and the switching current $I_P$ can be expressed as:

$$P_{IN} = \frac{1}{2 \times T} \times L_P \times I_P^2$$

-continued $$I_P = \frac{V_{IN}}{L_P} \times T_{ON}$$

Where $\eta$ is the efficiency of the transformer 30, $V_{IN}$ represents an input voltage of the transformer 30, $L_P$ represents a primary inductance of the transformer 30, T represents the switching period of the switching signal $V_{SW}$, and $T_{ON}$ represents the on-time of the switching signal $V_{SW}$.

Thus, equation (1) can be given by:

$$P_O = \eta \times \frac{V_{IN}^2 \times T_{ON}^2}{2 \times L_P \times T} \tag{2}$$

It can be understood from equation (2) that the switching period T changes in response to the frequency hopping. When the switching period T changes, the output power $P_O$ changes accordingly. Therefore, the unexpected ripple signal is generated when the output power $P_O$ changes.

Another disadvantage of the conventional technologies is the unexpected range of frequency hopping. Since the range of frequency hopping is related to the setting of the switching frequency, the effect of reducing the EMI is limited in response to different switching frequency setting under different application needs.

SUMMARY OF THE INVENTION

Accordingly, the present invention is directed to provide a frequency hopping control circuit for reducing the EMI of power supplies.

According to another aspect of the present invention, a frequency hopping control circuit is provided to prevent unexpected ripple signal at an output of a power supply.

Based on the aforementioned and other objectives, the present invention provides a frequency hopping control circuit for controlling a power supply. The control circuit includes a switching circuit, a first oscillator, a second oscillator, and an attenuator. The switching circuit is coupled to a feedback circuit to generate a switching signal for regulating an output of the power supply. The feedback circuit is coupled to the output of the power supply to generate a feedback signal for controlling the switching signal. The first oscillator is connected to the switching circuit to generate a clock signal for determining the switching frequency of the switching signal. The second oscillator generates an oscillating signal. A voltage-to-current converter of the second oscillator generates a first signal, a second signal, and a third signal in response to the oscillating signal, and transmits the first signal and the second signal to the first oscillator to modulate the frequency of the clock signal. The attenuator is coupled to the feedback circuit to attenuate the feedback signal. The third signal is coupled to the attenuator to control the attenuation rate of the feedback signal.

According to another aspect of the present invention, a frequency hopping control circuit is provided to control a power supply. The control circuit includes a switching circuit, a first oscillator, a second oscillator, and an attenuator. The switching circuit is coupled to a feedback circuit to generate a switching signal for regulating an output of the power supply. The feedback circuit is coupled to the output of the power supply to generate a feedback signal for controlling the switching signal. The first oscillator is coupled to the switching circuit to determine the switching frequency of the switching signal. The second oscillator generates an oscillating signal, and a first signal, a second signal, and a third signal based on the oscillating signal. The first signal and the second signal are transmitted to the first oscillator to modulate the switching frequency of the switching signal. The attenuator is coupled to the feedback circuit to attenuate the feedback signal. The third signal is coupled to the attenuator to control the impedance thereof.

The present invention further provides a controller having frequency hopping for controlling a power supply. The controller includes a switching circuit, a first oscillator, a second oscillator, and an attenuator. The switching circuit is coupled to a feedback circuit to generate a switching signal for regulating an output of the power supply. The feedback circuit is coupled to the output of the power supply to generate a feedback signal for controlling the switching signal. The first oscillator is coupled to the switching circuit to determine the switching frequency of the switching signal. The second oscillator is coupled to the first oscillator to modulate the switching frequency of the switching signal. The attenuator is coupled to the feedback circuit to attenuate the feedback signal. The second oscillator is connected to the attenuator to control the attenuation rate of the feedback signal.

The present invention provides another controller having frequency hopping for controlling a power supply. The controller includes a switching circuit, a first oscillator, and a second oscillator. The switching circuit is coupled to a feedback circuit to generate a switching signal for regulating an output of the power supply. The feedback circuit is coupled to the output of the power supply to generate a feedback signal for controlling the switching signal. The first oscillator is coupled to the switching circuit to determine the switching frequency of the switching signal. The second oscillator generates an oscillating signal, and a second signal in response to the oscillating signal, and transmits the second signal to the first oscillator to modulate the switching frequency of the switching signal.

In the present invention, the spectrum of the switching energy is extended. Therefore, the EMI of the power supply is reduced because the switching frequency of the switching signal is modulated. In addition, since the third signal controls the attenuation rate of the feedback signal (which controls the on-time of the switching signal), the variation thereof is compensated by hopping the switching frequency, and the output power and the output voltage are kept constant to avoid unexpected ripple signal at the output of the power supply, and to keep the frequency hopping operation not affected by the setting of the switching frequency of the power supply.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
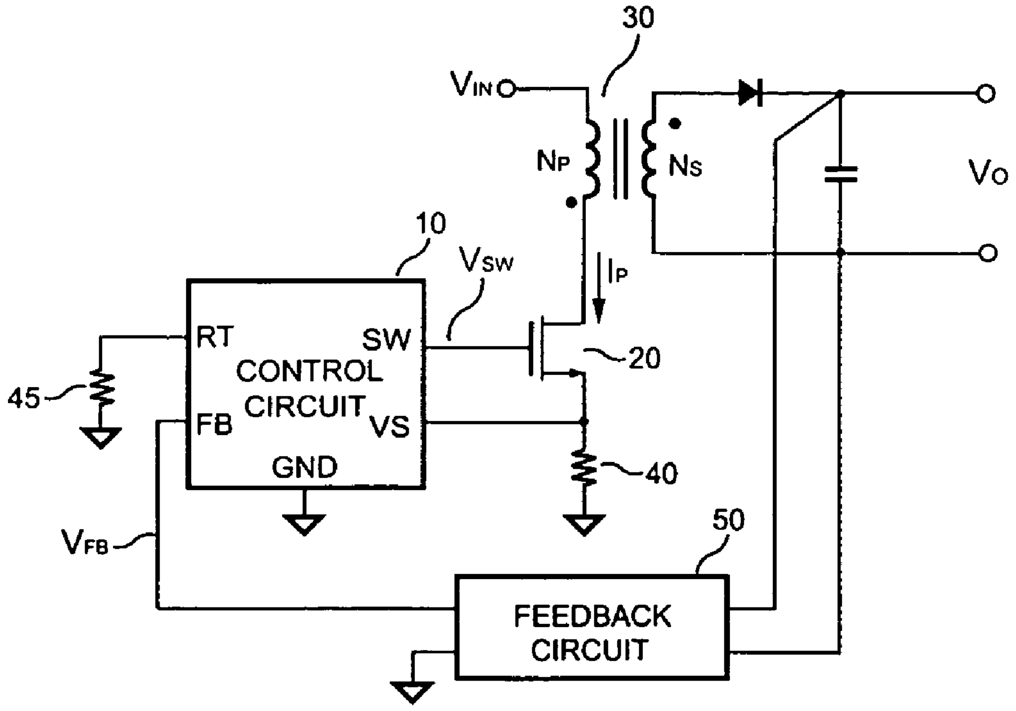
FIG. 1 (Prior Art)
FIG. 1 illustrates a conventional power supply.

FIG. 1 illustrates a conventional power supply. A control circuit 10 is coupled to a feedback circuit 50 to generate a switching signal $V_{SW}$ for regulating an output of the power supply. The switching signal $V_{SW}$ is generated in response to a feedback signal $V_{FB}$. The feedback circuit 50 is coupled to the output of the power supply to generate the feedback signal $V_{FB}$. A switching current $I_P$ of a transformer 30 is converted into a switching current signal $V_S$ by a sensing resistor 40. A switching current signal $V_S$ is provided to the control circuit 10 to generate the switching signal $V_{SW}$.

Figure 2:
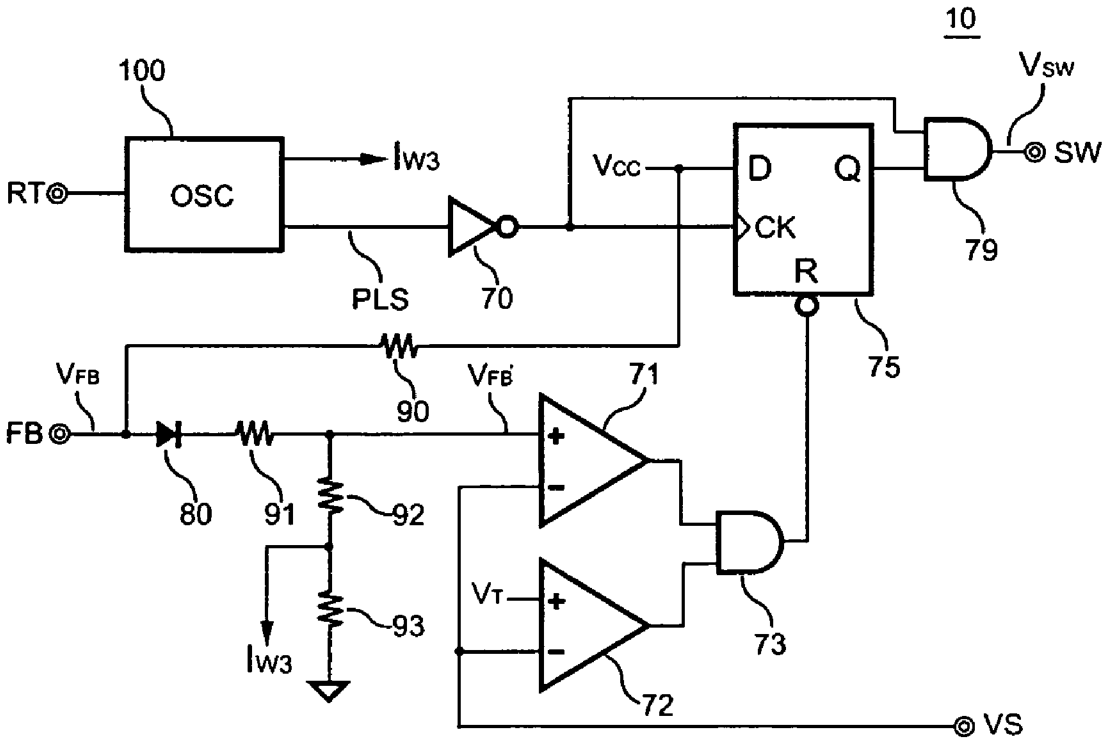
FIG. 2 is a circuit diagram of a control circuit according to an embodiment of the present invention.

FIG. 2 is a circuit diagram illustrating the control circuit 10 according to an embodiment of the present invention. Referring to FIG. 2, in the control circuit 10, a switching circuit includes comparators 71 and 72, a flip-flop 75, an inverter 70, AND gates 73 and 79, a diode 80, a resistor 90, and an attenuator composed of resistors 91, 92, and 93. The resistor 90 is used for pulling up the level at a terminal FB. The feedback signal $V_{FB}$ at the terminal FB is coupled to the resistor 91 through the diode 80. The diode 80 shifts the level of the feedback signal $V_{FB}$. The attenuator further attenuates the feedback signal $V_{FB}$ to reduce loop gain and stabilize the feedback loop of the power supply. The resistor 92 is connected between the resistor 91 and the grounded resistor 93. A joint of resistors 91 and 92 is connected to a positive input of the comparator 71 to provide an attenuated feedback signal $V_{FB}'$. A negative input of the comparator 71 is coupled to the switching current signal $V_S$. An output of the comparator 71 is coupled to a reset input of the flip-flop 75 through the AND gate 73. The switching current signal $V_S$ is further coupled to a negative input of the comparator 72. A reference voltage $V_T$ is provided to a positive input of the comparator 72. An output of the comparator 72 is used for resetting the flip-flop 75 through the AND gate 73. A clock signal PLS activates the flip-flop 75 through the inverter 70. An output of the inverter 70 is further connected to an input of the AND gate 79. Another input of the AND gate 79 is connected to an output of the flip-flop 75. An output of the AND gate 79 generates the switching signal $V_{SW}$. Accordingly, the switching signal $V_{SW}$ is switched in response to the clock signal PLS. The switching signal $V_{SW}$ is turned off immediately as long as the switching current signal $V_S$ is higher than the attenuated feedback voltage $V_{FB}'$ and/or the reference voltage $V_T$.

An oscillator 100 generates the clock signal PLS and a third signal $I_{W3}$. The oscillator 100 is connected to a resistor 45 via a terminal RT to determine an oscillating frequency of the clock signal PLS. The third signal $I_{W3}$ is drawn between the resistor 92 and the resistor 93 to set the attenuation rate of the feedback signal $V_{FB}$.

Figure 3:
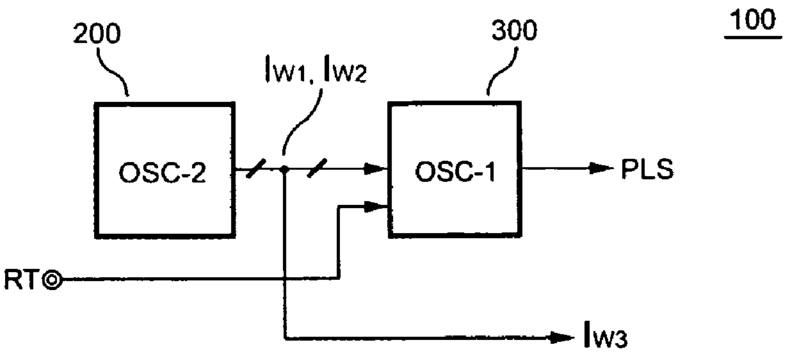
FIG. 3 is a block diagram of an oscillator according to an embodiment of the present invention.

The oscillator 100 includes a first oscillator 300 and a second oscillator 200, as shown in FIG. 3. The first oscillator 300 generates the clock signal PLS, and the second oscillator generates the third signal $I_{W3}$. The terminal RT is connected to the first oscillator 300.

Figure 4:
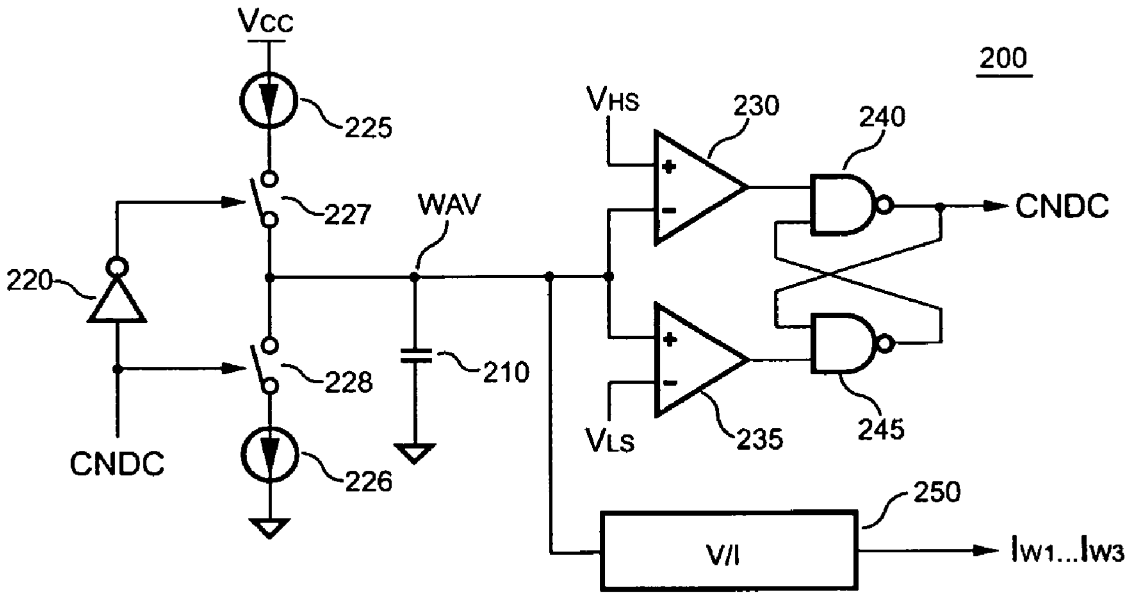
FIG. 4 is a circuit diagram of a second oscillator according to an embodiment of the present invention.

FIG. 4 is a circuit diagram of the second oscillator 200 according to an embodiment of the present invention. The second oscillator 200 includes a current source 225 for generating a charge current. The current source 226 generates a discharge current. A switch 227 is connected between the current source 225 and a capacitor 210. A switch 228 is connected between a current source 226 and the capacitor 210. Therefore, an oscillating signal WAV is generated across the capacitor 210. A reference voltage $V_{HS}$ is provided to a first input of a comparator 230. A second input of the comparator 230 is connected to the capacitor 210. A reference voltage $V_{LS}$ is provided to a second input of a comparator 235. A first input of the comparator 235 is connected to the capacitor 210. The level of the reference voltage $V_{HS}$ is higher than that of the reference voltage $V_{LS}$. An output of the comparator 230 is used for driving a first input of an NAND gate 240. An output of the NAND gate 240 is used for driving an inverter 220 and turning on/off the switch 228. An output of the inverter 220 is used for turning on/off the switch 227. Two inputs of an NAND gate 245 are connected to the output of the NAND gate 240 and an output of the comparator 235, respectively. An output of the NAND gate 245 is connected to a second input of the NAND gate 240. A voltage-to-current converter 250 generates a first signal $I_{W1}$, a second signal $I_{W2}$, and a third signal $I_{W3}$ in response to the oscillating signal WAV.

Figure 5:
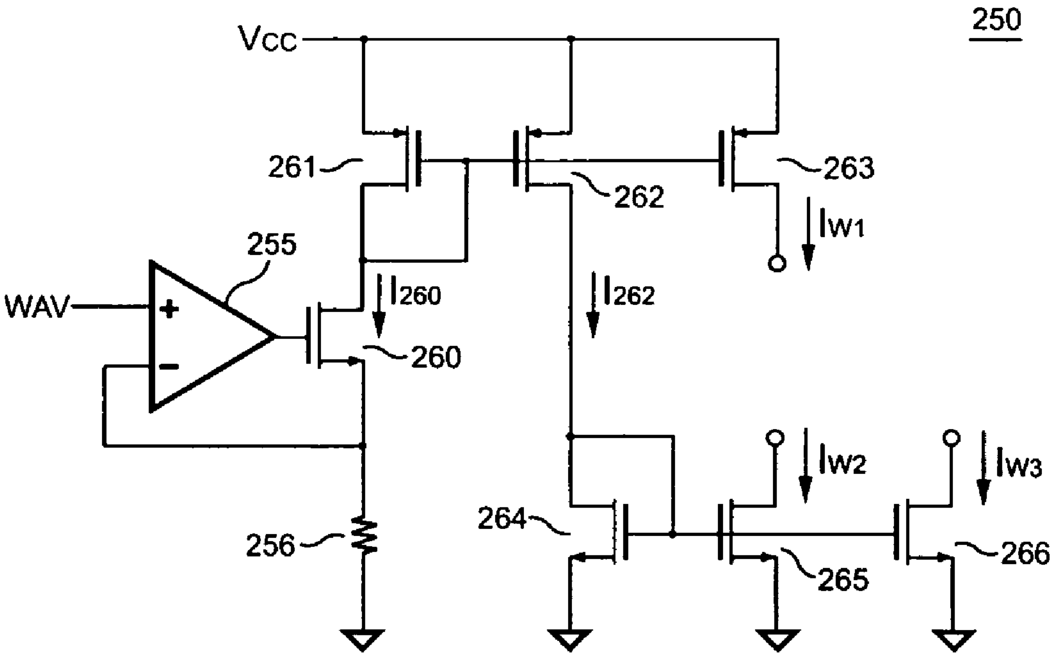
FIG. 5 is a circuit diagram of a voltage-to-current converter according to an embodiment of the present invention.

FIG. 5 is a circuit diagram of the voltage-to-current converter 250 according to an embodiment of the present invention. The voltage-to-current converter 250 including an operational amplifier 255, a resistor 256, and a transistor 260 is used for generating a current $I_{260}$ in response to the oscillating signal WAV. Transistor 261, transistor 262, and transistor 263 form a current mirror circuit to generate the current $I_{262}$ and the first signal $I_{W1}$ in response to the current $I_{260}$. Transistor 264, transistor 265, and transistor 266 form another current mirror circuit to generate the second signal $I_{W2}$ and the third signal $I_{W3}$ in response to the current $I_{262}$.

Figure 6:
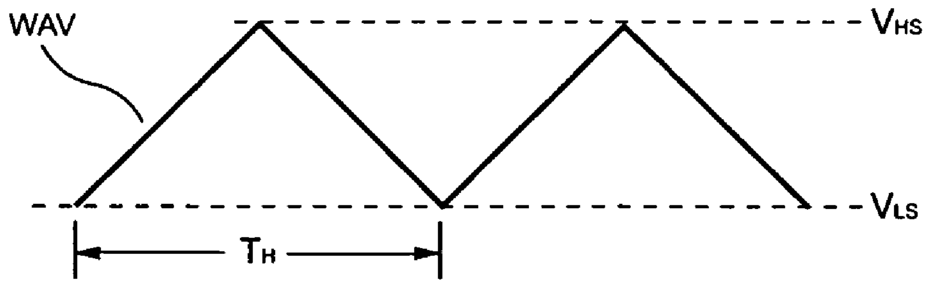
FIG. 6 is a waveform of an oscillating signal of the second oscillator according to an embodiment of the present invention.

FIG. 6 is a waveform of the oscillating signal WAV according to an embodiment of the present invention. The first signal $I_{W1}$, the second signal $I_{W2}$, and the third signal $I_{W3}$ are generated in response to the oscillating signal WAV. $T_H$ in FIG. 6 refers to a period of the oscillating signal WAV.

Figure 7A:
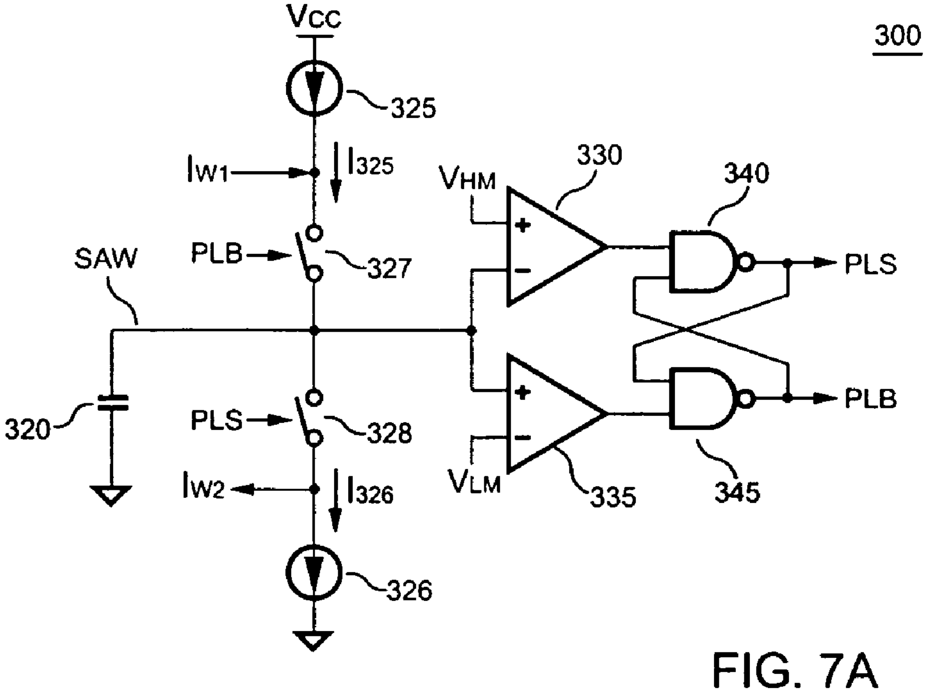
FIG. 7A is a circuit diagram of a first oscillator according to an embodiment of the present invention.

FIG. 7A is a circuit diagram of the first oscillator 300 according to an embodiment of the present invention. The oscillator 300 includes a charge current source 325 for generating a charge current $I_{325}$, a discharge current source 326 for generating a discharge current $I_{326}$, an oscillating capacitor 320 for generating a ramp signal SAW, a switch 327 connected between the charge current source 325 and the oscillating capacitor 320, and a switch 328 connected between the discharge current source 326 and the oscillating capacitor 320. A reference voltage $V_{HM}$ is provided to a first input of a comparator 330. A second input of the comparator 330 is connected to the oscillating capacitor 320. A reference voltage $V_{LM}$ is provided to a second input of a comparator 335. A first input of the second comparator 335 is connected to the oscillating capacitor 320. The level of the reference voltage $V_{HM}$ is higher than the reference voltage $V_{LM}$.

A NAND gate 340 is used for generating the clock signal PLS to determine the switching frequency of the switching signal $V_{SW}$. An output of the comparator 330 is used for driving a first input of the NAND gate 340. An output of the NAND gate 340 is used for turning on/off the switch 328. Two inputs of a NAND gate 345 are connected to the output of the NAND gate 340 and an output of the comparator 335 respectively. An output of the NAND gate 345 is connected to a second input of the NAND 340. The output of the NAND gate 345 is used for turning on/off the switch 327. Therefore, the ramp signal SAW is generated across the capacitor 320. The first signal $I_{W1}$ and the second signal $I_{W2}$ are coupled to a charge current $I_{325}$ of the charge current source 325 and a discharge current $I_{326}$ of the discharge current source 326 in parallel respectively to modulate the switching frequency.

Figure 7B:
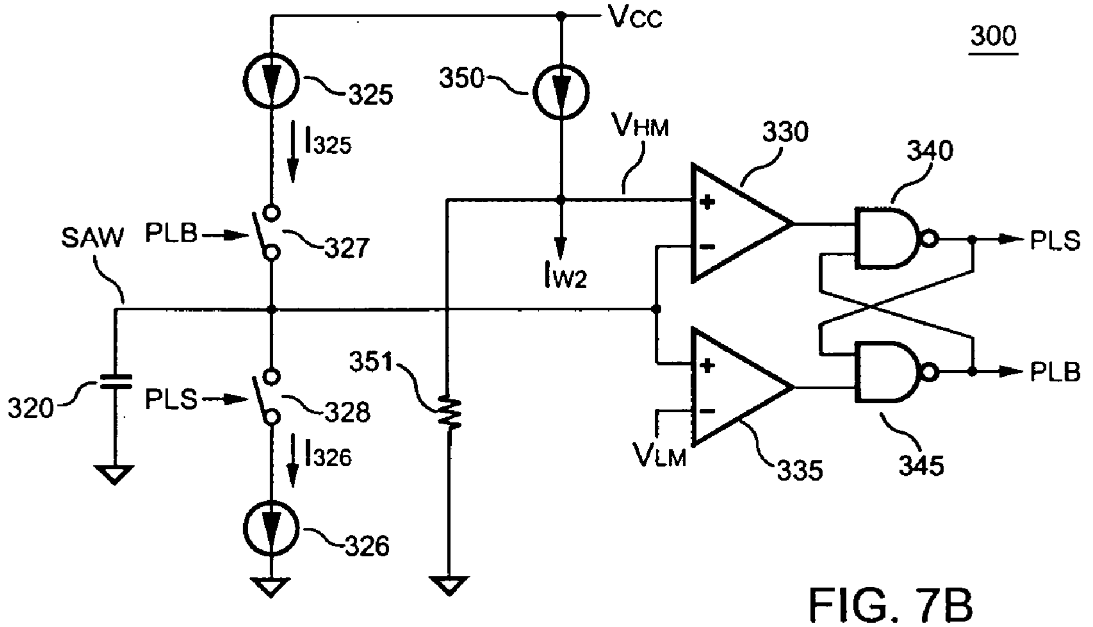
FIG. 7B is a circuit diagram of a first oscillator according to another embodiment of the present invention.

FIG. 7B is a circuit diagram of the first oscillator 300 according to another embodiment of the present invention. The first signal $I_{W1}$ and the second signal $I_{W2}$ are not used for charging/discharging the capacitor 320. The constant current source 350 is connected to a resistor 351 to generate the reference voltage $V_{HM}$. The second signal $I_{W2}$ is coupled to the capacitor 351 in parallel to modulate the switching frequency.

Figure 8:
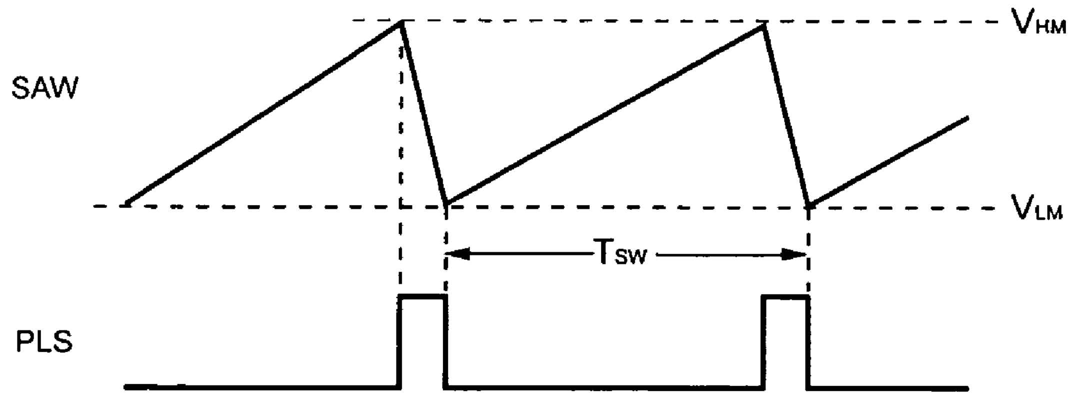
FIG. 8 is a waveform of the first oscillator according to an embodiment of the present invention.

FIG. 8 is a waveform of the ramp signal SAW and the clock signal PLS according to an embodiment of the present invention. $T_{SW}$ represents a period of the ramp signal SAW. The frequencies of the ramp signal SAW and the clock signal PLS are determined by the charge current $I_{325}$, the discharge current $I_{326}$, and the reference voltages $V_{HM}$ and $V_{LM}$. Here, the charge current $I_{325}$ and the discharge current $I_{326}$ are generated by the circuit shown in FIG. 9.

Figure 9:
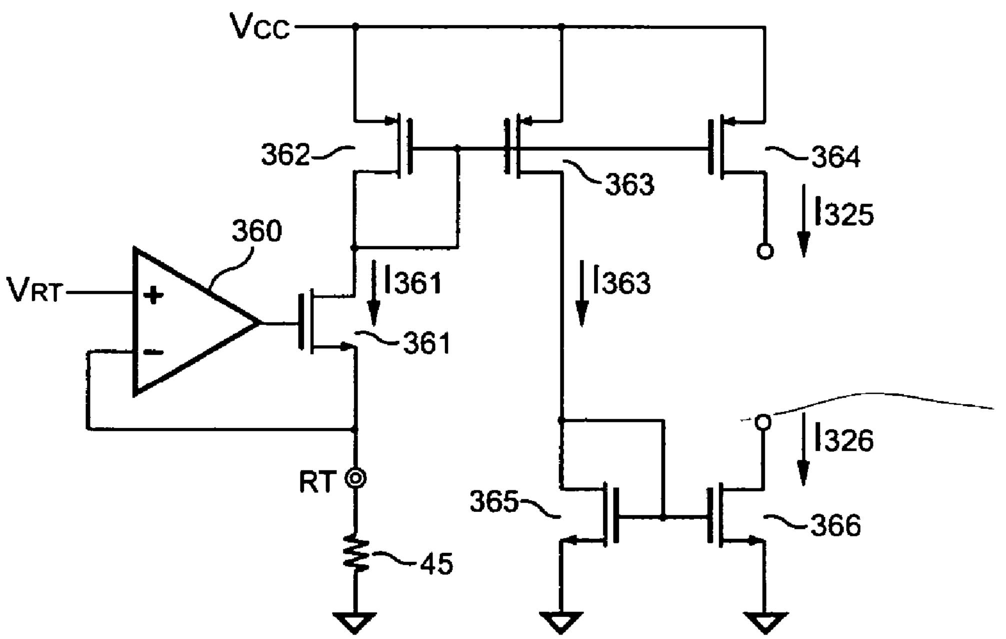
FIG. 9 is a circuit diagram of a charge current source and a discharge current source according to an embodiment of the present invention.

FIG. 9 is a circuit diagram of the charge current source 325 and the discharge current source 326 according to an embodiment of the present invention. An operational amplifier 360, the resistor 45, and a transistor 361 generate the current $I_{361}$ in response to a reference voltage $V_{RT}$. The transistors 362, 363, and 364 form a current mirror circuit for generating a current $I_{363}$ and the charge current $I_{325}$ in response to a current $I_{361}$. The transistors 365 and 366 form another current mirror circuit for generating the discharge current $I_{326}$ in response to the current $I_{363}$.

In other applications, the switching frequency can be determined by selecting the resistance of the resistor 45. The first signal $I_{W1}$, the second signal $I_{W2}$, and the third signal $I_{W3}$ change when the oscillating signal WAV of the second oscillator 200 changes, and further the switching frequency set by the first oscillator 300 is extended. When modulating the reference voltage $V_{HM}$ or the charge current $I_{325}$ and the discharge current $I_{326}$, the switching frequency of the switching signal $V_{SW}$ is hopped correspondingly. Thus the spectrum of the switching energy is extended. The EMI of the power supply is reduced accordingly. Referring to equation (2), the hopping of the switching period T varies the output power of the power supply. The third signal $I_{W3}$ further controls the attenuation rate of the feedback signal $V_{FB}$, which controls the on-time $T_{ON}$ of the switching signal $V_{SW}$. As a result, by hopping the switching frequency to compensate the variation thereof, the output power and the output voltage are kept constant.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control circuit, having frequency hopping capability for controlling a power supply, said control circuit comprising:

a switching circuit, coupled to a feedback circuit for generating a switching signal to regulate an output of said power supply, wherein said feedback circuit receives said output of the power supply to generate a feedback signal for controlling said switching signal;

a first oscillator, connected to said switching circuit for generating a clock signal to determine a switching frequency of said switching signal;

a second oscillator, for generating an oscillating signal, wherein said second oscillator includes a voltage-to-current converter to generate a first signal, a second signal, and a third signal in response to said oscillating signal, and to transmit said first signal and said second signal to said first oscillator for modulating a frequency of said clock signal; and an attenuator, coupled to said feedback circuit for attenuating said feedback signal, wherein said third signal is coupled to said attenuator to control an attenuation rate of said feedback signal.

2. The control circuit as claimed in claim 1, wherein said first oscillator comprises:

a first charge current source, for generating a first charge current, wherein said first signal is coupled to said first charge current source;

a first discharge current source, for generating a first discharge current, wherein said second signal is coupled to said first discharge current source;

a first oscillating capacitor;

a first charge switch, connected between said first charge current source and said first oscillating capacitor;

a first discharge switch, connected between said first discharge current source and said first oscillating capacitor;

a first comparator, having a first input supplied with a first reference voltage, said first comparator having a second input connected to said first oscillating capacitor;

a second comparator, having a second input supplied with a second reference voltage, said second comparator having a first input connected to said first oscillating capacitor, wherein said first reference voltage is higher than said second reference voltage;

a first gate, used for generating said clock signal to determine said switching frequency of said switching signal, wherein a first input of said first gate is coupled to an output of said first comparator, and an output of said first gate is used for turning on/off said first discharge switch; and a second gate, having two inputs connected to said output of said first gate and an output of said second comparator respectively, an output of said second gate being connected to a second input of said first gate, wherein said output of said second gate is used for turning on/off said first charge switch.

3. The control circuit as claimed in claim 1, wherein said second oscillator comprises:

a second charge current source, for generating a second charge current;

a second discharge current source, for generating a second discharge current;

a second oscillating capacitor, for generating said oscillating signal;

a second charge switch, connected between said second charge current source and said second oscillating capacitor;

a second discharge switch, connected between said second discharge current source and said second oscillating capacitor;

an inverter, having an output used for turning on/off said second charge switch;

a third comparator, having a first input supplied with a third reference voltage, said third comparator having a second input connected to said second oscillating capacitor;

a fourth comparator, having a second input supplied with a fourth reference voltage, said fourth comparator having a first input connected to said second oscillating capacitor, wherein said third reference voltage is higher than said fourth reference voltage;

a third gate, having a first input coupled to an output of said third comparator, said third gate having an output connected to an input of said inverter and turning on/off said second discharge switch; and a fourth gate, having two inputs connected to said output of said third gate and an output of said fourth comparator respectively, said output of said fourth gate being connected to a second input of said third gate; wherein said voltage-to-current converter is coupled to said second oscillator to generate said first signal, said second signal, and said third signal in response to said oscillating signal.

4. A control circuit having frequency hopping capability for controlling a power supply, said control circuit comprising:

a switching circuit, coupled to a feedback circuit for generating a switch signal to regulate an output of said power supply, wherein said feedback circuit receives said output of said power supply to generate a feedback signal for controlling said switching signal;

a first oscillator, coupled to said switching circuit for determining a switching frequency of said switching signal;

a second oscillator, for generating an oscillating signal and generating a first signal, a second signal and a third signal in response to said oscillating signal, wherein said first signal and said second signal are supplied to said first oscillator to modulate said switching frequency of said switching signal; and an attenuator, coupled to said feedback circuit for attenuating said feedback signal, wherein said third signal is coupled to said attenuator to control the impedance thereof.

5. The control circuit as claimed in claim 4, wherein said first oscillator comprises:

a first charge current source, for generating a first charge current;

a first discharge current source, for generating a first discharge current;

a first oscillating capacitor;

a first charge switch, connected between said first charge current source and said first oscillating capacitor;

a first discharge switch, connected between said first discharge current source and said first oscillating capacitor;

a first comparator, having a first input supplied with a first reference voltage, said first comparator having a second input connected to said first oscillating capacitor, wherein said second signal is coupled to a first input of said first comparator for modulating said first reference voltage;

a second comparator, having a second input supplied with a second reference voltage, said second comparator having a first input connected to said first oscillating capacitor, wherein said first reference voltage is higher than said second reference voltage;

a first gate, coupled to said switching circuit for determining said switching frequency of said switching signal, wherein a first input of said first gate is coupled to an output of said first comparator, an output of said first gate being used for turning on/off said first discharge switch; and a second gate, having two inputs connected to said output of the first gate and an output of said second comparator respectively, an output of said second gate being connected to a second input of said first gate, wherein said output of said second gate is used for turning on/off said first charge switch.

6. The control circuit as claimed in claim 4, wherein said second oscillator includes:

a second charge current source, for generating a second charge current;

a second discharge current source, for generating a second discharge current;

a second oscillating capacitor, for generating said oscillating signal;

a second charge switch, connected between said second charge current source and said second oscillating capacitor;

a second discharge switch, connected between said second discharge current source and said second oscillating capacitor;

an inverter, having an output used for turning on/off said second charge switch;

a third comparator, having a first input supplied with a third reference voltage, said third comparator having a second input connected to said second oscillating capacitor;

a fourth comparator, having a second input supplied with a fourth reference voltage, said fourth comparator having a first input connected to said second oscillating capacitor, wherein said third reference voltage is higher than said fourth reference voltage;

a third gate, having a first input coupled to an output of said third comparator, said third gate having an output coupled to an input of said inverter and turning on/off said second discharge switch; and a fourth gate, having two inputs connected to said output of said third gate and an output of said fourth comparator respectively, an output of said fourth gate being connected to a second input of said third gate;

wherein a voltage-to-current converter is coupled to said second oscillating capacitor to generate said first signal, said second signal and said third signal in response to said oscillating signal.

* * * * *